(12) United States Patent
Sowerby et al.

(10) Patent No.: US 11,487,644 B2
(45) Date of Patent: *Nov. 1, 2022

(54) GRAPHICS PROCESSING UNIT APPLICATION EXECUTION CONTROL

(71) Applicant: Apple Inc., Cupertino, CA (US)

(72) Inventors: Andrew M. Sowerby, San Francisco, CA (US); Jean-Francois Roy, San Bruno, CA (US); Filip Iliescu, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,447

(22) Filed: Jan. 22, 2021

(65) Prior Publication Data

US 2021/0224181 A1 Jul. 22, 2021

Related U.S. Application Data

(63) Continuation of application No. 15/851,663, filed on Dec. 21, 2017, now Pat. No. 10,901,873, which is a continuation of application No. 15/083,166, filed on Mar. 28, 2016, now Pat. No. 9,892,018, which is a continuation of application No. 13/306,530, filed on Nov. 29, 2011, now Pat. No. 9,298,586.

(60) Provisional application No. 61/546,041, filed on Oct. 11, 2011.

(51) Int. Cl.
*G06F 9/44* (2018.01)
*G06F 11/36* (2006.01)

(52) U.S. Cl.
CPC ................ *G06F 11/3624* (2013.01)

(58) Field of Classification Search
None
See application file for complete search history.

(56) References Cited

U.S. PATENT DOCUMENTS

| | | | |
|---|---|---|---|
| 6,003,143 | A | 12/1999 | Kim et al. |
| 6,067,643 | A | 5/2000 | Omtzigt |
| 6,412,106 | B1 | 6/2002 | Leask et al. |
| 6,657,634 | B1 | 12/2003 | Sinclair et al. |

(Continued)

FOREIGN PATENT DOCUMENTS

WO  WO 2013/055969  4/2013

OTHER PUBLICATIONS

AMD Developer Central, "GPU PerfStudio 2.3," launched Sep. 27, 2010, <http:ffdeveloper.amd.com/ gpu/PerfStudio/pages/APITraceWindow.sub.--aspx>, 11 pages.sub.-- [Retrieved Oct. 13, 2010].

(Continued)

*Primary Examiner* — Insun Kang
(74) *Attorney, Agent, or Firm* — BakerHostetler

(57) ABSTRACT

Debugging a graphics application executing on a target device. The graphics application may execute CPU instructions to generate graphics commands to graphics hardware for generation of graphics on a display. A breakpoint for the graphics application may be detected at a first time. In response to detecting the breakpoint, one or more graphics commands which were executed by the graphics hardware proximate to the first time may be displayed. Additionally, source code corresponding to CPU instructions which generated the one or more graphics commands may be displayed.

20 Claims, 17 Drawing Sheets

(56) References Cited

U.S. PATENT DOCUMENTS

| | | | |
|---|---|---|---|
| 6,809,735 B1 | 10/2004 | Stauffer | |
| 6,922,821 B1 | 7/2005 | Nemecek | |
| 7,020,871 B2 | 3/2006 | Bernstein et al. | |
| 7,287,246 B2 | 10/2007 | Tan et al. | |
| 7,406,625 B2 | 7/2008 | Brock et al. | |
| 7,451,332 B2 | 11/2008 | Culbert et al. | |
| 7,453,465 B2 | 11/2008 | Schmieder et al. | |
| 7,487,371 B2 | 2/2009 | Simeral et al. | |
| 7,600,155 B1 * | 10/2009 | Nickolls | G06F 11/36 714/38.13 |
| 7,711,990 B1 * | 5/2010 | Nickolls | G06F 11/3648 714/37 |
| 8,006,232 B1 | 8/2011 | Rideout et al. | |
| 8,146,061 B2 | 3/2012 | Xu | |
| 8,327,175 B2 | 12/2012 | Kim et al. | |
| 8,645,920 B2 | 2/2014 | Maybee | |
| 8,745,537 B1 | 6/2014 | Shakeri | |
| 2002/0083217 A1 | 6/2002 | Ward et al. | |
| 2002/0140710 A1 | 10/2002 | Fliflet | |
| 2004/0098639 A1 | 5/2004 | Liu | |
| 2007/0139421 A1 | 6/2007 | Chen et al. | |
| 2008/0049009 A1 | 2/2008 | Khodorkovsky | |
| 2009/0082008 A1 | 3/2009 | Thorell | |
| 2009/0158257 A1 | 6/2009 | Xu | |
| 2009/0219288 A1 | 9/2009 | Heirich | |
| 2009/0228873 A1 | 9/2009 | Drukman et al. | |
| 2009/0309885 A1 | 12/2009 | Samson et al. | |
| 2010/0017788 A1 | 1/2010 | Bronkhorst et al. | |
| 2010/0050158 A1 | 2/2010 | Daniel | |
| 2011/0018884 A1 * | 1/2011 | Ritts | G06F 11/32 345/522 |
| 2011/0191752 A1 | 8/2011 | Cleraux et al. | |
| 2011/0307870 A1 | 12/2011 | Stairs | |
| 2012/0042303 A1 | 2/2012 | Demetriou et al. | |
| 2012/0151446 A1 | 6/2012 | Sathya et al. | |
| 2012/0167056 A1 | 6/2012 | Brunswig et al. | |
| 2012/0272218 A1 | 10/2012 | Bates | |
| 2012/0272219 A1 | 10/2012 | Bates | |
| 2012/0323553 A1 | 12/2012 | Aslam et al. | |
| 2013/0091493 A1 | 4/2013 | Sowerby et al. | |

OTHER PUBLICATIONS

Keng-Yu Lin, "GPTT: A Cross-Platform Graphics Performance Tuning Tool for Embedded System," National Sun Yat-sen University, 2006, 61 pages.

McDowell ct al. "Debugging Concurrent Programs", Dec. 1989, ACM, vol. 21, No. 4.

Moher, "Provide: A Process Visualization and Debugging Environment", Jun. 1988,IEEE, vol. 14, No. 6.

Mukerjea et al. "Toward Visual Debugging: Integrating Algorithm Animation Capabilities within a Source-Level Debugger". Sep. 1994, vol. 1 No. 3, pp. 215-244.

Nvidia, "PcrfHUD 6 User Guide," DA-01231-001.sub.--v09, Nov. 2008, 37 pages.

Pix User's Guide, msdn, 2006, <http://msdn.sub.--microsoft.com/en-US/library/ee417207%28v=VS.sub.--8- 5%29.sub.--aspx>, 54 pages [Retrieved Oct. 13, 2009].

Rosenberg, Jonathan B., "How Debuggers Work: Algorithms, Data Structures, and Architecture", Wiley Publishing Copyright, New York, NY, pp. 21-37, Jan. 1, 1996.

Indian Office Action from Indian Patent Application No. 2619/CHENP/2014 dated Aug. 7, 2019, 5 pages.

Summons to attend oral proceedings from EP 12779246,3, dated Oct. 15, 2018, 9 pages.

* cited by examiner

FIG. 7B

```
{
    AutoDebugMarker marker("structure");

NSInteger i = 0;

glBindVertexArrayOES(structureVertexArray);

for (ObjMaterialUsage *materialUsage in [structureModelGroup
        materialUsages])
    {
        AutoDebugMarker::format marker("material<%d>", i);

setup(i++);
        glDrawElements(GL_TRIANGLES, [materialUsage indexRange].
            length, structureModelGroupIndexDataType, (void *)
            ([materialUsage indexRange].location *
            [structureModelGroup bytesPerIndex]));
    }
}

- (GLKVector3)sunDirectionForTime:(CFTimeInterval)time
{
    double sunTime = (time / 22.5f);
    sunTime -= floor(sunTime);
    sunTime = MIN(sunTime * 1.5, 1.0);

float offAngle = GLKMathDegreesToRadians(105.0f);
    float pathAngle = GLKMathDegreesToRadians(sunTime * 180.0f);
```

```
        {
            float r = 2.0 + 0.85 * cos(time / (4.0 * fairySpeeds[i]));
            float t = time * copysignf(fabsf(fairyPhases[i]) + 0.25f, fairyPhases[i] - 0.5) / 4.0f
            ;

lightPositions[i] = GLKVector3Make(cosf(t) * r, 1.5f, sinf(t) * r);
            lightColors[i] = fairyColors[i];
            lightRadii[i] = 0.5f;
        } lightPositions[i] = GLKVector3Make(0.0f, 2.0f, 2.0f);
        lightColors[i] = GLKVector3Make(1.0f, 0.875f, 0.75f);
        lightRadii[i] = 5.0f;
    }

- (void)renderStructureWithGroupSetup:(void (^)(NSInteger groupIndex))setup
{
    AutoDebugMarker marker("structure");

NSInteger i = 0;

glBindVertexArrayOES(structureVertexArray);

for (ObjMaterialUsage *materialUsage in [structureModelGroup materialUsages])
    {
        AutoDebugMarker::format marker("material<%d>", i);

setup(i++);
        glDrawElements(GL_TRIANGLES, [materialUsage indexRange].length,
            structureModelGroupIndexDataType, (void *)([materialUsage indexRange].location *
            [structureModelGroup bytesPerIndex]));
    }
}

- (GLKVector3)sunDirectionForTime:(CFTimeInterval)time
{
    double sunTime = (time / 22.5f);
    sunTime -= floor(sunTime);
    sunTime = MIN(sunTime * 1.5, 1.0);

float offAngle = GLKMathDegreesToRadians(105.0f);
    float pathAngle = GLKMathDegreesToRadians(sunTime * 180.0f);
    float pathScale = sinf(offAngle);

return GLKVector3Make(pathScale * cosf(pathAngle), pathScale * sinf(pathAngle), cosf
        (offAngle));
}

- (GLKMatrix4)shadowMatrixForTime:(CFTimeInterval)time
{
    GLKVector3 sunLocation = GLKVector3MultiplyScalar([self sunDirectionForTime:time], 12.0);
    GLKMatrix4 cameraMatrix = GLKMatrix4MakeLookAt(sunLocation.x, sunLocation.y, sunLocation.z
        , 0.0f, 0.0f, 0.0f, 0.0f, 1.0f, 0.0f);

GLKMatrix4 projectionMatrix = GLKMatrix4MakeOrtho(-6.5, 6.5, -6.5, 6.5, 3.5, 18.5);

return GLKMatrix4Multiply(projectionMatrix, cameraMatrix);
}
```

*FIG. 9C*

GRAPHICS PROCESSING UNIT APPLICATION EXECUTION CONTROL

PRIORITY INFORMATION

This application is a continuation of U.S. patent application Ser. No. 15/851,663, filed Dec. 21, 2017, now U.S. Pat. No. 10,901,873, which is a continuation of U.S. patent application Ser. No. 15/083,166, filed Mar. 28, 2016, now U.S. Pat. No. 9,892,018, which is a continuation of U.S. patent application Ser. No. 13/306,530, filed Nov. 29, 2011, now U.S. Pat. No. 9,298,586, which claims benefit of priority of U.S. provisional application Ser. No. 61/546,041 titled "Debugging a Graphics Application Executing on a Target Device" filed Oct. 11, 2011, whose inventors were Andrew M. Sowerby, Benjamin N. Lipchak, Jean-Francois Roy, Max Drukman, Matthew Firlik, and Christopher Friesen, which are hereby incorporated by reference in their entirety as though fully and completely set forth herein.

FIELD

The present embodiments relate to the field of computer graphics, and more particularly to debugging graphics applications.

DESCRIPTION OF THE RELATED ART

Many modern devices include high end graphical processing systems for presenting graphics on a display. Due to their complexity, development of graphical software applications for such devices is often difficult. For example, it is difficult for developers to perform debugging on target devices which uses a different graphics system than the development system. Accordingly, in order to assist developers in creating graphical software applications, improved tools are desired for debugging these applications.

SUMMARY

Various embodiments are presented of a system and method for debugging graphics applications executing on a target device.

The target device and a host device may be paired together. The host device may execute a development application to perform development and/or debugging of an application on the target device. The host device may deploy the application to the target device and begin execution of the application on the target device. The host device may also deploy other programs on the target device in order to capture information regarding the execution of the application on the target device and/or debug the application. For example, the host device may deploy one or more measurement and/or debugging applications for performing debugging.

The target device may include a graphics system which includes both a central processing unit (CPU) and a graphics processing unit (GPU). The CPU and GPU may together execute the application. For example, the graphics application may execute CPU instructions which generate graphics commands for provision to the GPU for providing graphics on a display of the target device. A breakpoint (or capture event) may be reached during execution of the application (e.g., which was inserted in the graphics application or invoked response to user input, e.g., during execution, as desired). In response to the breakpoint, the target device may suspend execution of the application, e.g., saving the current state of the application for later resumption. Additionally, the target device may capture information, e.g., for use in debugging the application. For example, the target device may capture information related to the current graphics frame (e.g., the first full frame after the breakpoint is reached), such as the graphics commands executed to generate the current frame. This information may be provided back to the host device for performing the debugging.

Graphics commands that were executed proximate to the breakpoint (e.g., the graphics commands of the first full frame after the breakpoint) may be displayed, e.g., on a display of the host device to a developer of the application. Additionally, source code corresponding to the CPU instructions which generated the one or more graphics commands may be displayed. Further, graphics data corresponding to the graphics command may also be displayed. In one embodiment, a user may select one of the graphics commands, and the corresponding source code which caused the graphics command may be displayed. Additionally, the corresponding graphics of the graphics command may also be displayed. Thus, a user may be able to view the interrelated source code, graphics command, and/or graphics data. More specifically, the user may be able to view the source code and/or graphics data associated with a graphics command executed in the frame after the breakpoint (although other embodiments are envisioned, e.g., where graphics commands prior to the breakpoint may be displayed). These debugging actions may be performed in conjunction with a debug application executing on the target device (e.g., acting to provide saved information interactively or simply at the beginning of the debugging). In one embodiment, the debug application may provide the ability to replay graphics (e.g., GPU) commands that occurred proximate to the breakpoint and provide that information to the host device.

After debugging is completed, e.g., after a user ends the debugging or requests that the application resume execution, the target device may resume execution of the application, e.g., by loading the saved state and continuing execution of the application. In one embodiment, the process of suspending the application, performing debugging (e.g., using a debugging application executing on the target device, e.g., in conjunction with the development environment executing on the host device), and resuming the application may be performed in a seamless manner, e.g., which is transparent to the user.

BRIEF DESCRIPTION OF THE DRAWINGS

A better understanding of the present embodiments can be obtained when the following detailed description of the preferred embodiment is considered in conjunction with the following drawings, in which.

Figure 1A:
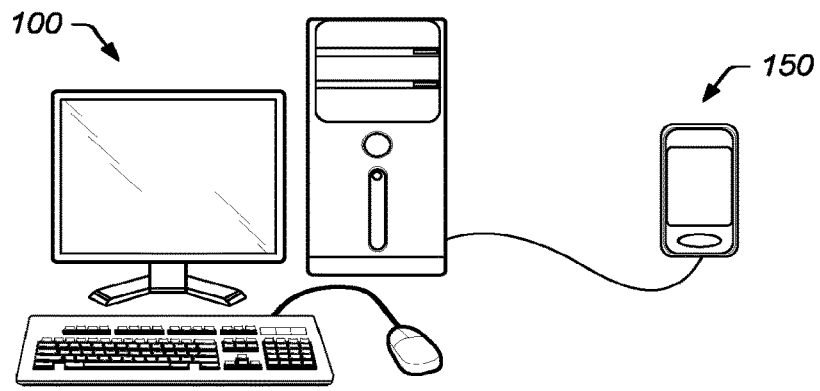
FIGS. 1A-1E illustrate various systems for implementing various embodiments.

While embodiments described herein are susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIGS. 1A-1E—Exemplary Systems

FIG. 1A illustrates a computer system 100 (host) that is coupled to a target device 150. The host computer system 100 may be any of various computer systems. The target device 150 may also be any of various computer systems. In some embodiments, the target device 150 may be a portable or mobile device, such as a mobile phone, PDA, audio/video player, etc. In embodiments described herein, the computer system 100 may be configured to act as a host device, which may manage execution of an application (e.g., a graphics application) on the target device 150, e.g., for application development, as described herein.

As shown in FIG. 1A, the computer system 100 may include a display device configured to display a graphical user interface (GUI), e.g., of a control or development application executing on the computer system 100. The graphical user interface may include any type of graphical user interface, e.g., depending on the computing platform. The computer system 100 may include at least one memory medium on which one or more computer programs or software components may be stored. For example, the memory medium may store the control application, e.g., which may be executable to perform at least a portion of the methods described herein. Additionally, the memory medium may store a programming development environment application (or developer's tools application) used to create applications, e.g., for execution by the target device 150. The memory medium may also store operating system software, as well as other software for operation of the computer system. Various embodiments further include receiving or storing instructions and/or data implemented in accordance with the foregoing description upon a carrier medium.

As also shown in FIG. 1A, the target device 150 may include a display, which may be operable to display graphics provided by an application executing on the target device 150. The application may be any of various applications, such as, for example, games, internet browsing applications, email applications, phone applications, productivity applications, etc. The application may be stored in a memory medium of the target device 150. The target device 150 may include a central processing unit (CPU) and a graphics processing unit (GPU) which may collectively execute the application. For example, the CPU may generally execute the application as well as a graphics framework (e.g., OpenGL, DirectX, etc.) and graphics driver which may handle any graphics calls or commands that are provided by the application during execution. The graphics driver may in turn provide GPU commands to the GPU, which may execute these commands to provide display capabilities for the application. As used herein, a "graphics application" refers to an application which provides graphics commands for displaying graphics of the application on a display. In other words, the term "graphics application" refers to a software application that, when executed, causes the display of various graphics on a display, e.g., via graphics commands.

The memory medium of the target device 150 may also store one or more programs for implementing embodiments described herein. For example, the memory medium of the target device 150 may store a program for capturing information regarding graphics commands received from the application. The memory medium of the target device 150 may also store a program for debugging the application, e.g., which may be provided from the computer system 100. In further embodiments, the programs may be stored on the computer system 100 and may be read onto the target device 150 for execution.

Figure 1B:
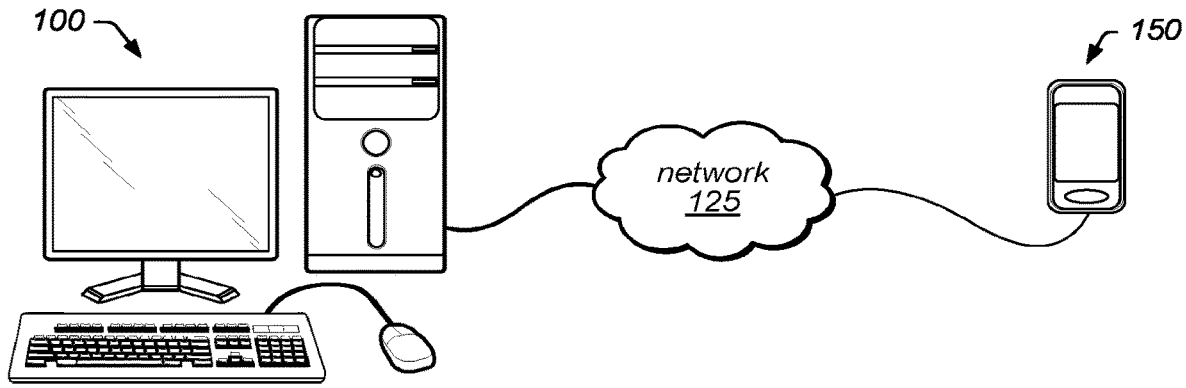

FIG. 1B illustrates a system including the computer system 100 that is coupled to the target device 150 over a network 125. The network 125 can be any of various types, including a LAN (local area network), WAN (wide area network), the Internet, or an Intranet, among others. In general, the computer system 100 and the target device 150 may be coupled in any of various manners, such as wired (e.g., over a serial bus, such as USB, Ethernet, Internet, etc.) or wireless (e.g., WLAN, Bluetooth, IR, etc.).

Figure 1C:
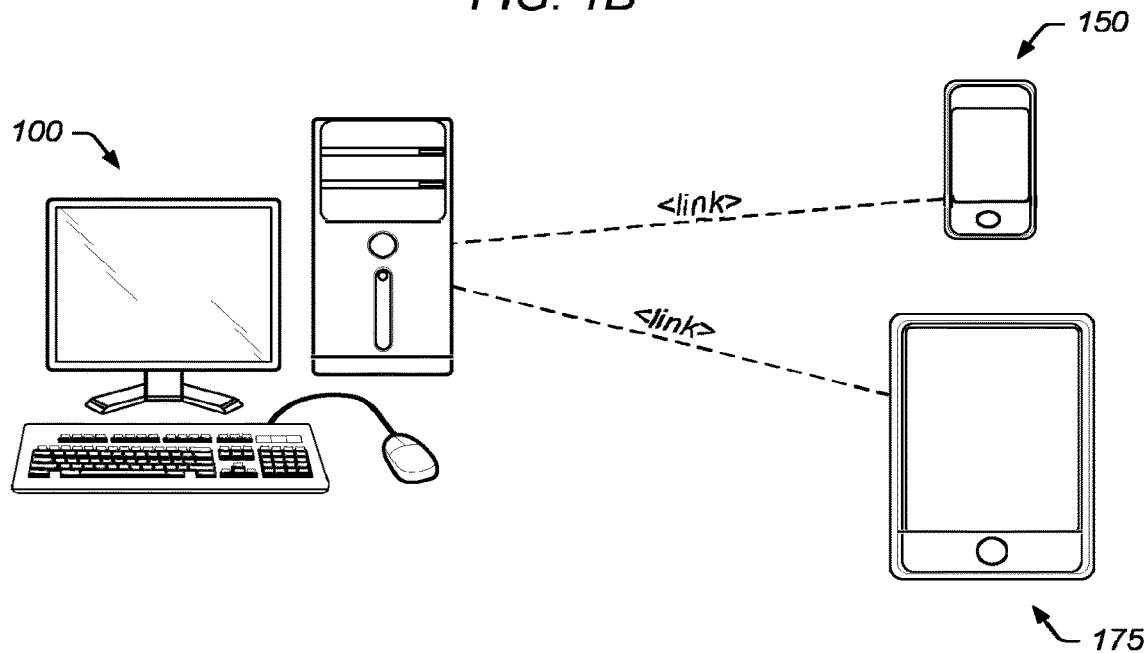

FIG. 1C illustrates a system where the host computer system 100 is coupled to the target device 150 as well as another target device 175. As shown, the target device 175 may be a different type of target device than the target device 150. In one embodiment, the application may be executed on both of the target device 150 and 175. For example, the application may be debugged on either or both of the target devices 150 and 175. Accordingly, debugging results may be provided that are generic and/or specific to a particular target device. Thus, the results and/or testing may vary among different types of target devices.

Figure 1D:
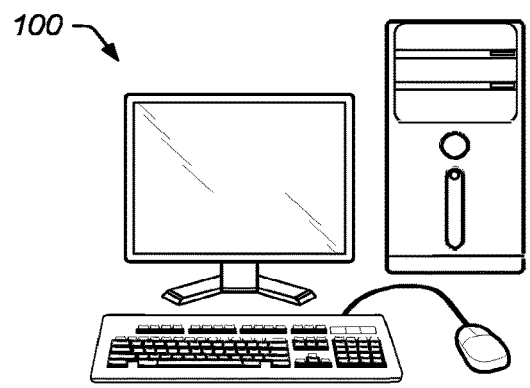
Figure 1E:
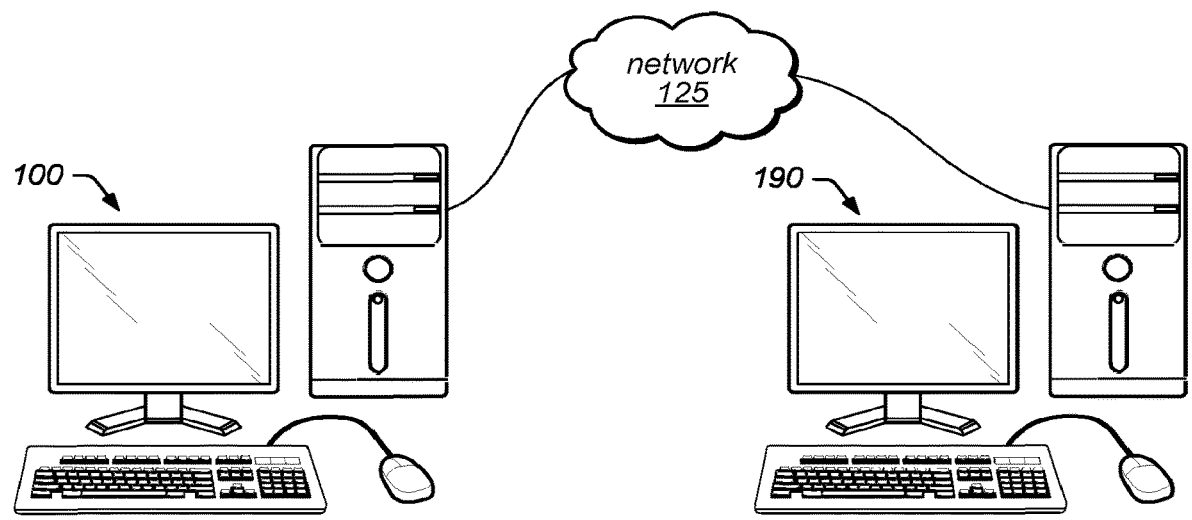

FIGS. 1D and 1F illustrate systems where a computer system may be the target device. In FIG. 1D, the computer system 100 may be the target device as well as the host device. In this embodiment, the computer system 100 may execute both the target application and the control program, thus effectively operating as both the host and target device. However, embodiments described herein usually involve two separate devices, a host and a target. For example, in FIG. 1E, a different computer system 190 may be the target device. The two computer systems 100 and 190 may be coupled over the network 125 as shown, or may be coupled directly, as desired.

Figure 2A:
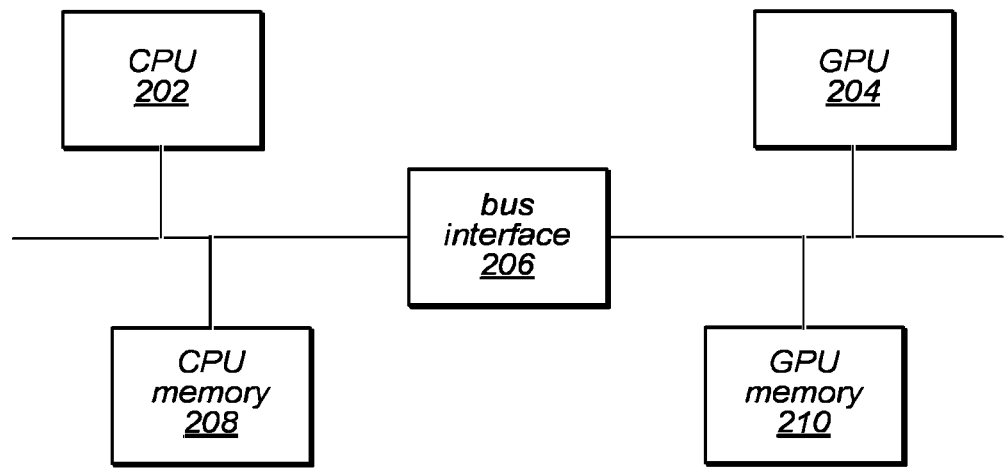
FIGS. 2A and 2B are block diagrams of a system including a CPU and a GPU, according to some embodiments.
Figure 2B:
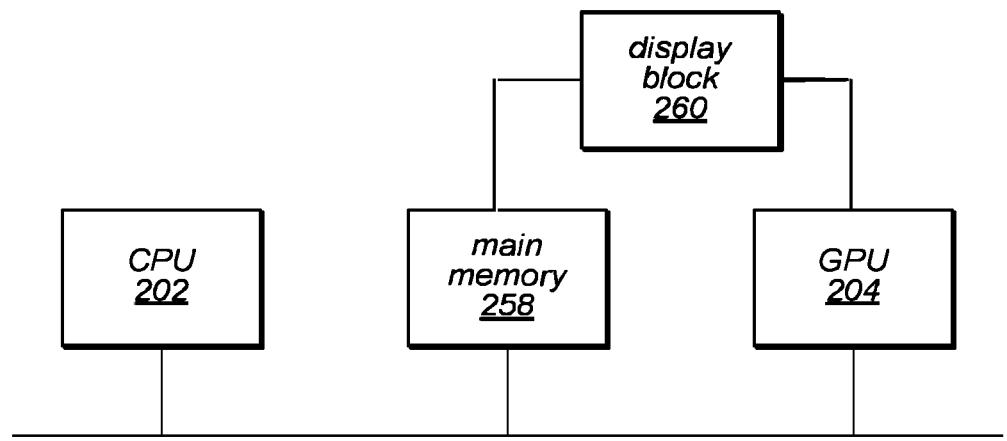

FIGS. 2A-2B—Exemplary Block Diagrams of Graphics System Hardware

FIGS. 2A and 2B are block diagrams of embodiments of target device hardware implementing a graphics system. It is noted that FIGS. 2A and 2B are simplified block diagrams, where various components that would normally be present, but which are not necessary for an understanding of the present embodiments, are omitted for simplicity and clarity.

More specifically, FIG. 2A illustrates one embodiment of a hardware architecture of a target device and/or computer system, such as 150, 175, 100 or 190. As shown, the CPU 202 and CPU memory 208 may be coupled together (e.g., over a system bus) and GPU 204 and GPU memory 210 may also be coupled together. The CPU 202 and GPU 204 (and their corresponding memories) may be coupled via bus interface 206. For example, in one embodiment, the GPU 204 and GPU memory 210 may be implemented as a video system having a different system interface than the CPU 202 and CPU memory 208. For example, the GPU 204 and GPU memory 210 may be implemented as a video card that is plugged in to a slot of the computer system 100 or 190. The video card may be implemented as a PCI, PCIe, AGP, etc. card. Accordingly, bus interface 206 may interface with the system bus of the CPU 202 and the bus of the video card. The target device, 150, 175, 100 or 190 may also include display logic (not shown) as well as various other logic.

FIG. 2B illustrates an alternative embodiment of a hardware architecture that may be implemented by target device 150 or 175. In this architecture, the CPU 202 and GPU 204 may be coupled over a system bus and may share a common or unified memory 258 (although separate memories are envisioned). Additionally, a display block 260 may be coupled to memory 258 and GPU 204 for displaying various images on the display of the target device 150 and 175. This implementation may apply to devices whose internal hardware are all or mostly provided within a single integrated chip, e.g., as a system on a chip (SOC).

It should be noted that the above hardware architectures of the graphics system are exemplary and are provided for illustration purposes only. Thus, various modifications (e.g., of blocks or connectivity) resulting in different hardware architectures are envisioned.

Figure 3:
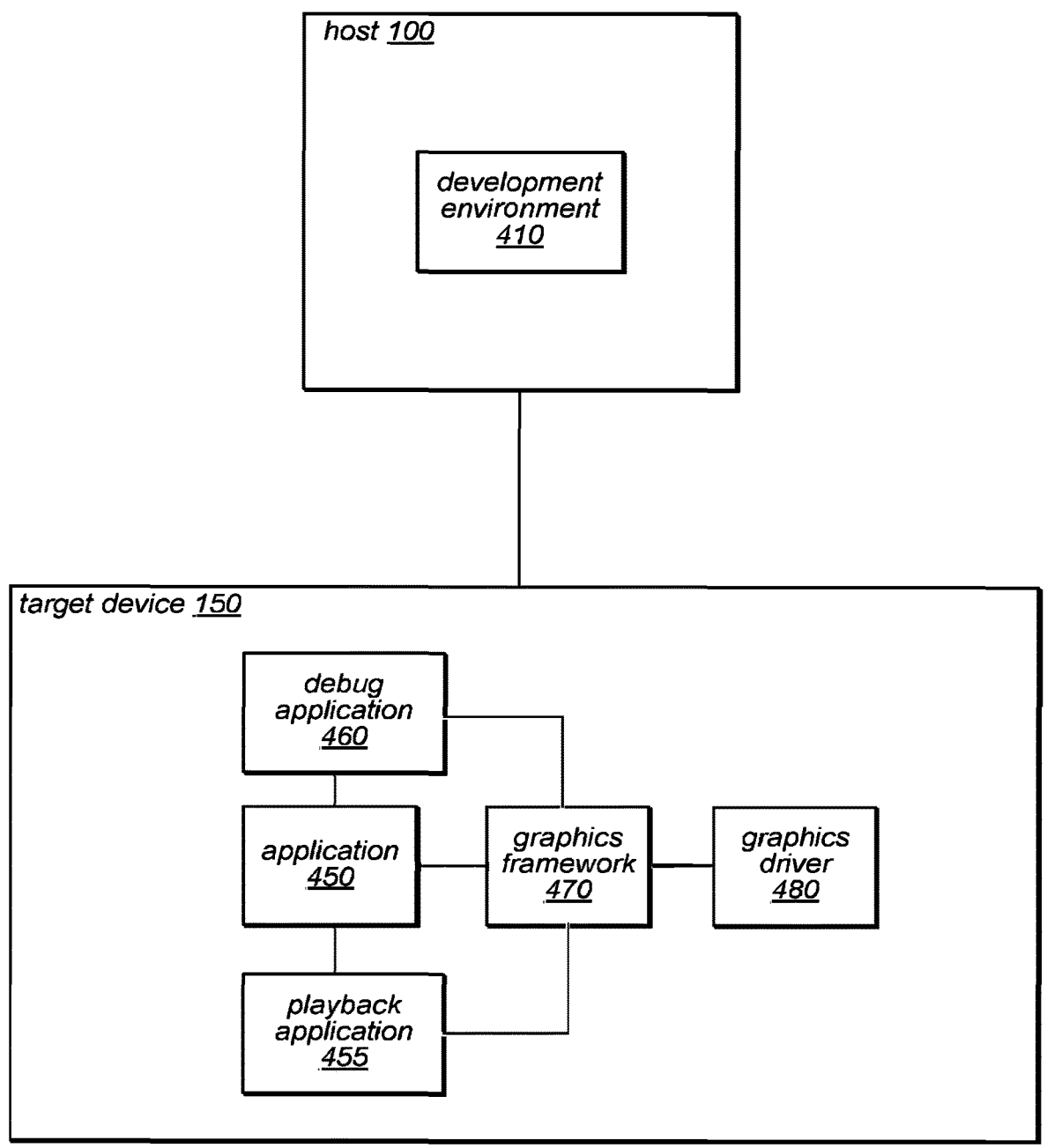
FIG. 3 is a block diagram of software executing on a host device and a target device, according to one embodiment.

FIG. 3—Exemplary Block Diagram of Software Architecture

FIG. 3 is a block diagram of one embodiment of a software architecture that may implement various embodiments described herein.

As shown in FIG. 3, the host 100 may execute a development environment or control application 410. The development environment 410 may be used to develop applications for execution on the target device 150. The development environment 410 may also control execution of a developed application 450, a playback application 455, a debug application 460, etc. that may be executing on the target device 150.

As also shown in FIG. 3, the target device 150 may execute a variety of programs, including application 450, debug application 460, playback application 455, graphics framework 470, and graphics driver 480. While this diagram largely shows programs that are executed by the CPU of the target device 150, note that the GPU of the target device 150 may also execute programs, e.g., shaders, that may be provided by the application 450.

In more detail, the application (or graphics application) 450 may be an application that is under development or testing, e.g., within the development environment 410. For example, a developer may be developing the application on the host 100 for ultimate deployment and execution on the target device, and may periodically need to test or debug the application while it is executing on the target device 150. Correspondingly, the development environment 410 may be used to deploy the application to the target device 150 for execution and testing.

The development environment 410 may also deploy other software to the target device 150 to assist in developing the application 450, e.g., once the developer has designated that the target device 150 is used for development of the application 450. For example, the development environment 410 may deploy the debug application 460 which may be used to debug the application 450 on the target device 150, e.g., as described herein. In some embodiments, the playback functionality implemented by the playback application 455 may be incorporated in the debug application 460, as desired.

The graphics framework 470 may be any of various types of graphics frameworks, e.g., various versions of openGL (including openGL for embedded systems (ES)), DirectX, etc. The graphics framework 470 may receive API calls from the application 450 for performing graphics framework functions. In turn, the graphics framework 470 may provide commands to the graphics driver 480, which may also be executing on the target device 150. Finally, the graphics driver 480 may provide GPU commands to the GPU. The CPU executing the graphics framework 470 and the graphics driver 480, along with the GPU may form a graphics pipeline, such as those embodiments described in FIGS. 4A and 4B below.

Note that the above software architecture is exemplary only and other variations and modifications are envisioned. For example, in some embodiments, the graphics framework 470 may not be necessary and/or may be implemented as part of the application 450 rather than being a separate executable.

Figure 4A:
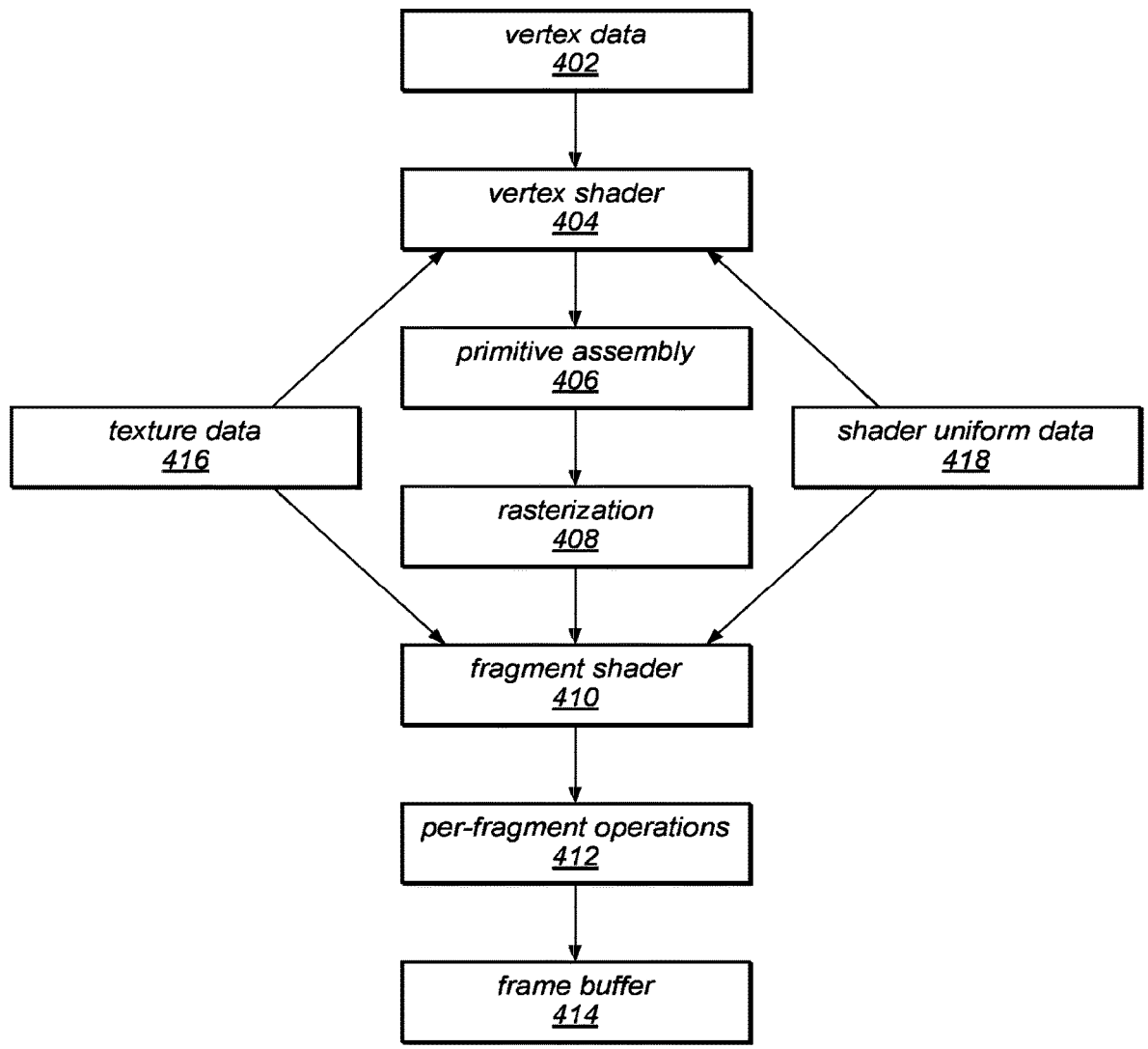
FIGS. 4A-B are exemplary block diagrams illustrating embodiments of a graphics pipeline.
Figure 4B:
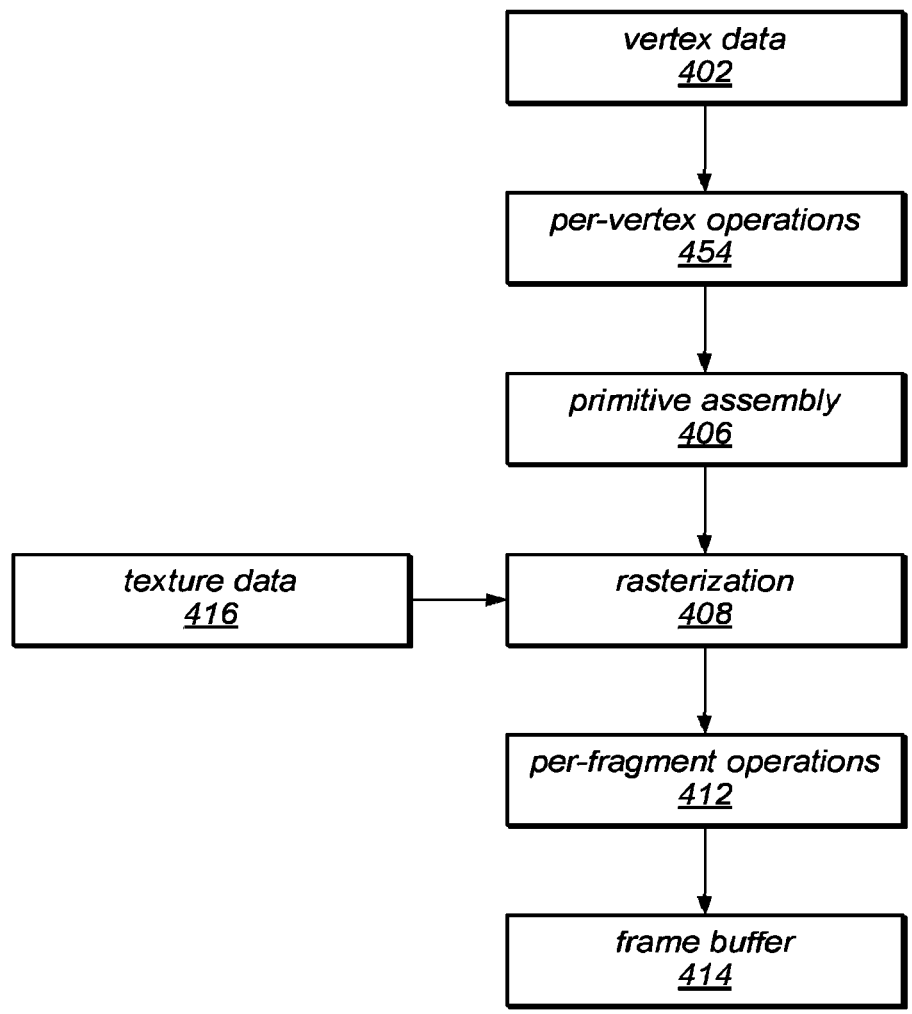

FIGS. 4A and 4B—Exemplary Graphics Pipeline

FIGS. 4A and 4B illustrate exemplary graphics pipelines. More particularly, FIG. 4A illustrates an OpenGL embedded system (ES) 2.0 pipeline and FIG. 4B illustrates an OpenGL embedded systems (ES) 1.1 pipeline, e.g., which may be suitable for a target device 150, such as a mobile device. However, the pipelines of FIGS. 4A and 4B may also be implemented on a computer system such as computer system 100, e.g., with further modifications. For example, a typical OpenGL pipeline may be used for the computer system 100 (rather than an ES pipeline). The pipelines of FIGS. 4A and 4B may be implemented using the graphics system of FIG. 2A or 2B and may also interact with the software architecture of FIG. 3. For example, the pipeline of FIGS. 4A and 4B may be implemented as software executing on the CPU and/or GPU processes. Note that the GPU may execute various software on the GPU to perform portions of the graphics pipeline and/or may include dedicated hardware for performing those portions, as desired.

In the graphics pipeline of FIG. 4A, the pipeline may begin with vertex data in 402. The vertex data may specify the vertices of the graphics data to be rendered. In one embodiment, the vertex data may include data about polygons with vertices, edges and faces that constitute an entire scene.

in 404, the vertex data of 402 may be processed by a vertex shader. More particularly, the vertex shader may be run for each vertex, e.g., by the GPU. This process may transform each vertex's 3D position in virtual space to the 2D coordinate at which it will appear on the display. The vertex shader may manipulate various properties, including position, color, texture coordinate, etc. As shown, the vertex shader 404 may be informed by texture data 416 and/or shader uniform data 418.

In 406, primitives may be assembled from the vertices output from 404. For example, in this stage vertices may be collected and converted into geometric shapes, e.g., triangles.

In 408, the primitives may be used in rasterization. More particularly, the primitives from 406 may be filled with pixels or fragments.

In 410, the fragment shader (e.g., executed by the GPU) may add textures and final colors to the fragments. Fragment shaders may typically take into account scene lighting and related effects, such as bump mapping and color toning. As shown, the fragment shader may be informed by texture data 416 and shader uniform data 418.

In 412, various per-fragment operations may be performed. For example, the operations may combine the final fragment color, its coverage, and/or degree of transparency with the existing data stored at the associated 2D location in the frame buffer to produce the final color for the pixel to be stored at that location.

In 414, the data may be stored in physical memory which holds the actual pixel values displayed on the screen. The frame buffer memory may also store graphics commands, textures, and/or other attributes associated with each pixel. This data may be used to output the final image to the display.

FIG. 4B illustrates an abbreviated pipeline that may be more appropriate for embedded systems. As shown, is the pipeline includes vertex data 402, per-vertex operations 454 (similar to vertex shader 404), primitive assembly 406, rasterization 408, per-fragment operation 412, and frame buffer 414. This pipeline does not utilize the fragment shader 410 or the shader uniform data 418. Additionally, the texture data is only utilized by rasterization 408 rather than by shaders, as in FIG. 4A.

Thus, FIGS. 4A and 4B illustrate exemplary graphics pipelines that may be utilized in embodiments described herein. However, other, different graphics pipelines are envisioned.

Figure 5:
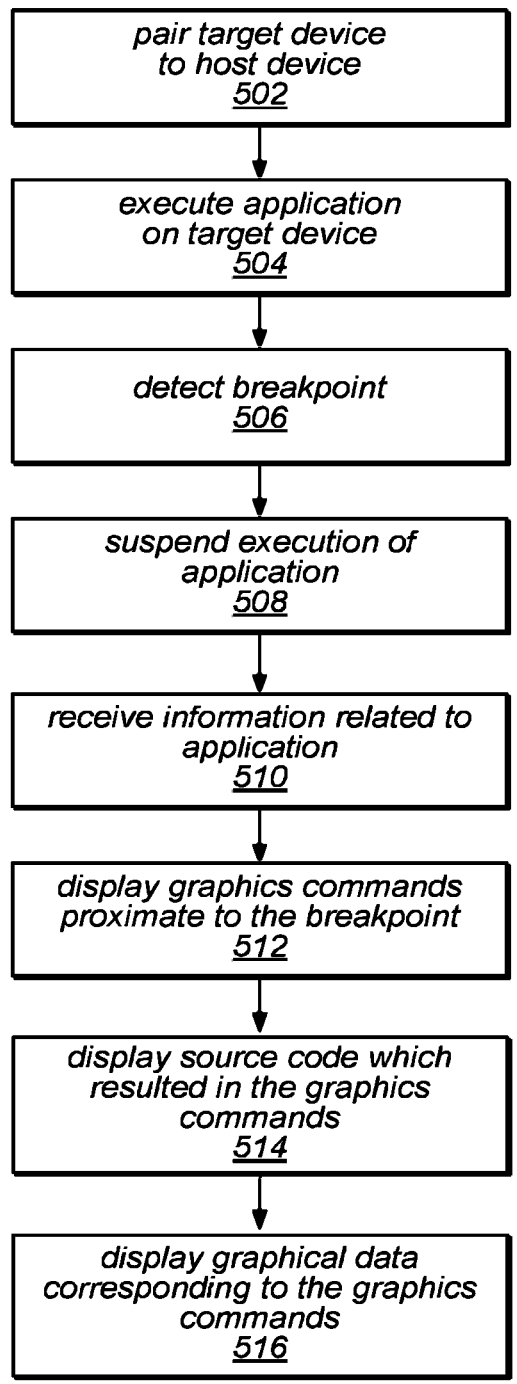
FIG. 5 is a flowchart diagram illustrating one embodiment of a method for debugging an application executing on a target device.

FIG. 5—Debugging Execution of an Application on a Target Device

FIG. 5 illustrates a method for debugging an application executing on a target device. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a target device may be coupled (or paired) to a host device. As indicated above, the target device and host device may be coupled together in a variety of ways, e.g., directly via a wired or wireless connection, or indirectly, over a network (e.g., an Intranet or the Internet).

In 504, an application may be executed on the target device. For example, the application may be developed using a development environment program executed by the host device. The user (e.g., the developer) may compile the application for execution and/or deploy the application to the target device using the development environment. For example, in response to a command to run the application on the target device, the development environment may automatically perform those actions. As indicated above, the development environment program may also deploy other programs to the target device, e.g., debugging programs or other programs as desired.

Once the application is deployed on the target device, the development environment program may initiate execution of the application (and/or any other programs, such as those described above) on the target device, e.g., by sending an execution command to the target device. In one embodiment, the user may select a "play" button, which may cause the application to be compiled (if necessary), deployed (if necessary), and executed by the target device. Thus, in 504, execution of the application by the target device may be initiated.

In 506, a breakpoint may be reached or detected at a first time. For example, the breakpoint may be identified in the source code of the application (and correspondingly in CPU instructions resulting from compilation or interpretation of the application). For example, the developer of the application may have manually inserted a breakpoint into the code using the development environment, e.g., indicating that the application should cease execution upon reaching a particular point in the application. Accordingly, the breakpoint may have been compiled into the application, and upon execution, one or more CPU instructions may be used to implement the breakpoint to cease execution at the specified location of the application. Alternatively, or additionally, a user may provide input to initiate a breakpoint during execution of the application. For example, while monitoring execution of the application, e.g., visually, the user may provide input to cause the application to cease executing. In one embodiment, the user may provide the input to the host device, e.g., using a keyboard or mouse, or may provide the input to the target device, as desired. Thus, the breakpoint may be initiated in a variety of manners. Note that the breakpoint may also be considered a "capture event" or a "capture trigger event" which results in the actions described herein. In some embodiments, such an event may be implemented via a CPU breakpoint. Thus, the term "breakpoint", as used herein, includes embodiments where it is implemented as a "capture event".

In 508, in response to the breakpoint, the target device may suspend or cease execution of the application, e.g., automatically. Depending on how the breakpoint was specified, this suspension may be initiated in a variety of manners. For example, if the breakpoint was compiled into the application, the breakpoint may be caused by a CPU instruction executed by a processor of the device. Accordingly, in this embodiment, the breakpoint may be detected locally. Similarly, if the breakpoint is specified via user input to the target device, the breakpoint may be detected locally. However, where the input is received to the host device, the breakpoint may be detected by the target device via a command sent from the host device. For example, in one embodiment, the user may provide input to stop execution of the application to the host device, e.g., using a keystroke to initiate the breakpoint, and, in response, the host device may provide a command to the target device to cease execution of the application. As discussed below, regarding FIG. 6, the target device may save various information (e.g., state information) regarding the application to suspend the application, e.g., so that the application may be resumed at a later point.

Additionally, in 510, information may be received from the target device, e.g., for use in debugging the information. More specifically, the target device may automatically capture this information and provide the information to the host device. For example, the target device may capture information related to the current graphics frame, such as the graphics commands executed in the current frame, e.g., of the graphics framework. For example, the target device may capture information of a graphics frame immediately following the breakpoint. However, note that this embodiment is exemplary only, and the target device may capture information for frames prior to the breakpoint (e.g., using a measurement application executing concurrently with the application, as discussed herein).

The information may include data related to any step of the graphics pipeline, e.g., from the application, the graphics framework, the graphics driver, and/or the GPU, among other possibilities. Thus, the information may be any of various data that may be gathered from the target device to assist in performing debugging. As discussed below, the information may be used to display various graphics commands and graphics data to the user, e.g., in the development environment on the host device.

In one embodiment, the information may be captured by a measurement application executing on the target device, e.g., concurrently with the application. For example, the measurement application may gather CPU load information, GPU load information, and/or other information. In further embodiments, the measurement application may intercept and record graphics commands provided by the application. Thus, the information may include those graphics commands (e.g., encoded in a bitstream) and may be provided back to the host device for performing the debugging, as discussed below.

Note that the gathering of information and suspension of the application in 508 and 510 may be performed in a different order or may be performed concurrently, e.g., as a single step.

In 512, graphics commands that were executed proximate to the breakpoint may be displayed, e.g., on a display of the host device to a developer of the application. In one embodiment, the displayed graphics commands may correspond to those called in the frame immediately following the breakpoint. In one embodiment, a frame may be considered the list of commands (e.g., graphics commands) that are executed between one buffer render and the next (e.g., initiated by a frame render command). In most cases, the render buffer is redrawn in full each frame, although this need not be the case—for example, if the application does not clear the render buffers, then the results of a previous frame can remain in the buffers, e.g., for further modification in the next frame render.

Alternatively, or additionally, the displayed graphics commands may correspond to those called prior to the breakpoint (e.g., for one or more frames prior to the breakpoint). However, the graphics commands may span over any desired length of time, depending on how they were captured. For example, as discussed above, a measurement application may have captured graphics commands for any desired length of time during execution of the application up to the point in time of the breakpoint.

In one embodiment, the graphics commands may be displayed in a pane of the development environment executing on the host device. Additionally, individual ones of the graphics commands may be selectable by a user, e.g., to view other code or graphics data associated with the selected graphics commands, as discussed below. In one embodiment, a user may select a first graphics command that interests the user, e.g., to view more information about the state of the application or graphics framework at that point in time.

The graphics commands discussed above may be graphics commands along any portion of the graphics pipeline. For example, as discussed above regarding FIG. 3, the graphics application may include source code which uses certain graphics API calls. This source code may be compiled into CPU instructions which call functions of the graphics API. Accordingly, during execution of the application, certain graphics framework commands may be initiated or triggered in response to the CPU. The graphics framework may in turn use the graphics driver to initiate graphics instructions executed by the GPU of the target device. As used herein, "graphics commands" may refer to any of the graphics functions or instructions that are outside of the application, e.g., those of the graphics framework, graphics driver, GPU, etc. In one specific embodiment, the graphics commands may refer to those of the graphics framework, which are initiated by the application. Note that these graphics commands are triggered by the application.

Additionally, in 514, source code corresponding to the CPU instructions which generated or triggered the one or more graphics commands may be displayed. For example, the source code of the application may be displayed in another pane of the GUI of the development environment. As discussed above, the user may select an individual graphics command. In response, the portion of the source code that initiated the graphics command may be visually indicated, e.g., in the development environment. For example, the graphics command may have been initiated (e.g., directly or indirectly) by a particular portion of the source code. Accordingly, the method may automatically determine the originating source code and highlight that portion of the source code, e.g., in response to user selection of the graphics command. Thus, a user may easily determine the originator of a particular graphics command, which may make the process of debugging the application substantially easier when a graphics glitch or issue is noticed by the user. Thus, instead of the user manually figuring out the initiating source code of the bug, the method may automatically identify the source code from the specified graphics command.

Note that the process may also operate in the reverse fashion. For example, the user may be able to select a portion of source code and the corresponding graphics commands may indicated, e.g., visually, in the development environment.

Further, in 516, graphics data corresponding to the graphics commands may also be displayed. For example, as discussed above, a first graphics command may be selected, e.g., by the user. Accordingly, graphics data that was displayed in response to the first graphics command or at the time of the first graphics command may be automatically displayed, within a portion of the development environment. For example, the displayed graphics data may correspond to what was shown on the target device's display. In some embodiments, the particular portion of the graphics data that was affected or modified by the graphics command may be visually highlighted within the graphics data.

Similar to embodiments discussed above, the process may operate in the reverse fashion for the graphics data. For example, a user may select a portion or object of the graphics data and the graphics command(s) and/or source code which resulted in that portion may be visually indicated, e.g., highlighted. In one embodiment, the user may be able to view a sequence of graphics data corresponding to the changes implemented by each graphics command performed during the period of time (e.g., the last data frame or the portion of time where the information was gathered), e.g., "scrubbing" through the sequence of modifications to the graphic based on the graphics commands. Accordingly, the user may stop the graphics data at a particular point in time and view the graphics commands and/or source code associated with that graphics data/point in time.

Thus, in one embodiment, a user may select one of the graphics commands, and the corresponding source code which caused the graphics command may be displayed. Additionally, the corresponding graphics of the graphics command may also be displayed. Thus, a user may be able to view the inter-related source code, graphics command, and/or graphics data. More specifically, the user may be able to view the source code and/or graphics data associated with a graphics command executed proximate to (e.g., within a frame) the breakpoint. These debugging actions may be performed in conjunction with a debug application executing on the target device (e.g., acting to provide saved information interactively or simply at the beginning of the debugging).

In one embodiment, the debug application may provide the ability to replay the graphics commands, e.g., that occurred proximate to the breakpoint, and provide that information to the host device. For example, render data or information stored in a buffer may be necessary to display graphics data corresponding to a graphics command. Accordingly, the host device may request the render data and the target device may execute one or more graphics commands to generate or retrieve the render data and supply it back to the host. For example, the target device may replay the frame (e.g., the set of graphics commands) up to and including the point of the requested data to calculate the state at that point. Other types of data and queries and responses between the host and target devices are envisioned. Thus, in some embodiments, rather than providing all of the necessary debugging information upon reaching the breakpoint and/or suspending the application, the host device and target device may iteratively request and provide information (respectively) during the debugging process.

After debugging is completed, e.g., after a user ends the debugging or requests that the application resume execution, the target device may resume execution of the application, e.g., by loading the saved state and continuing execution of the application, as discussed in more detail below regarding FIG. 6. However, in further embodiments, execution of the application may be stopped or closed upon reaching the breakpoint rather than suspended. Additionally, the application may be re-executed rather than resumed. Thus, the suspension of the application and resumption of the application may not be necessary—other embodiments are envisioned.

Figure 6:
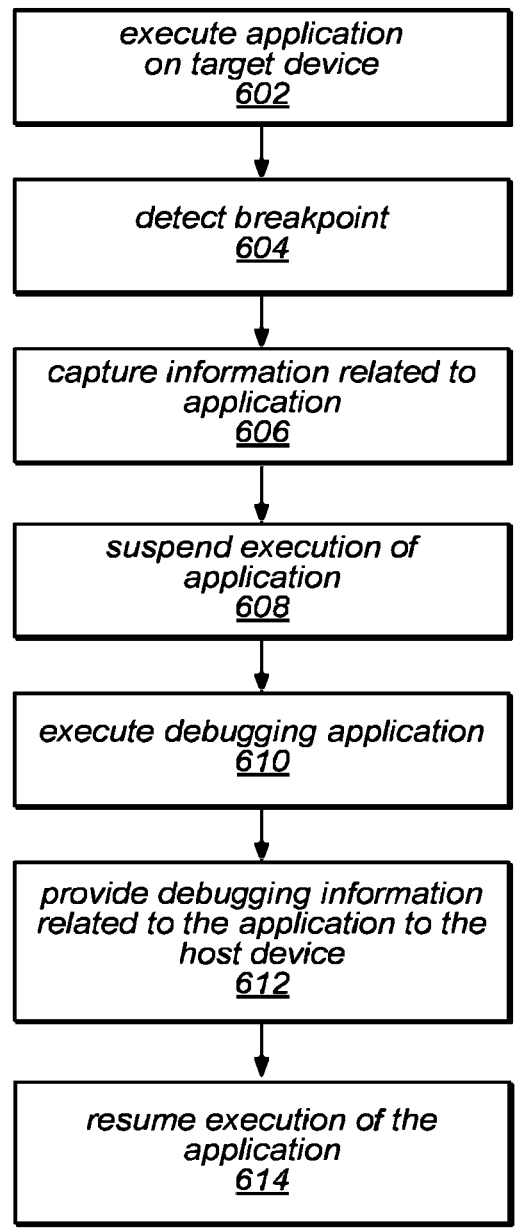
FIG. 6 is a flowchart diagram illustrating one embodiment of a method for suspending and resuming execution of an application to perform debugging.

FIG. 6—Suspending and Resuming Execution of an Application

FIG. 6 illustrates a method for suspending and resuming execution of an application on a target device, e.g., for performing testing, such as debugging. The method shown in FIG. 6 may be used in conjunction with any of the computer systems or devices shown in the above Figures, among other devices. More specifically, FIG. 6 provides further details regarding suspension and provision of information, indicated regarding FIG. 5 above. In various embodiments, some of the method elements shown may be performed concurrently, in a different order than shown, or may be omitted. Additional method elements may also be performed as desired. As shown, this method may operate as follows.

In 602, an application may be executed on the target device, e.g., similar to 504 described above.

In 604, a breakpoint may be detected, e.g., as discussed above in 506.

In 606, information related to the application may be captured automatically, and in 608, execution of the application may be suspended automatically. For example, the current state of the application may be saved for later resumption. In some embodiments, the state information and/or other information that may be used for later resumption may be stored in non-volatile memory (e.g., the target device's long term storage device) and/or volatile memory (e.g., RAM), as desired. Note that the capturing of state information may be related to any portion of the target device, e.g., within the graphics pipeline, such as the application, the graphics framework, the graphics driver, the GPU, the CPU, etc.

In one embodiment, in addition to capturing state information, various portions of the target device may be locked in order to suspend execution of the application. For example, the graphics framework may be locked using a framework command to suspend the current state of the graphics framework. This locking may apply to various subsystems within the target application, e.g., without affecting other processor or applications executing on the target device. For example, in this particular example, access to the graphics framework may be locked for the target application only, not for every process or application of the target device. In one embodiment, the locking may be performed to allow for orderly suspension and/or resumption of the target application. More precisely, debugging commands or operations may or may not be executed before or after suspension on one or more subsystems (e.g., the graphics framework). These commands or operations may or may not require exclusive access, within the target application, to the subsystem they affect. In one embodiment, locking may be necessary because execution of these commands or operations need to occur within the execution context of the application. Similar embodiments apply to other portions of the target device, either in software or hardware.

In 610, a debugging application may be executed by the target device. The debugging application may be configured to provide information to the host device to perform debugging. Similar to embodiments discussed above, this debugging information may be provided initially, e.g., upon suspension of the application, or in an iterative manner, e.g., numerous times, in response to requests from the host device. For example, as discussed above, the initial information may indicate the set of graphics commands executed in the graphics frame proximate to the breakpoint, although other periods of times are envisioned (e.g., prior to the breakpoint). The additional information could include requested data from a render buffer, which may require re-execution of some of the graphics commands by the target device to determine the current state of the render buffer. Said another way, the re-execution of the graphics commands may restore the state of the requested render buffer to a point in time (e.g., location in the captured sequence of graphics commands) specified in the requests, such that the resulting state of the render buffer may be obtained from the target device and provided to the host device. Accordingly, that data may be automatically determined and provided to the host device in response to the request.

In some embodiments, the debugging application may be distributed among multiple applications or software components. For example, functionality of the debugging application may be split among a measurement or capture application that may be executed concurrently with or even within the application of 602 and/or a playback application executed after suspension of the application of 602. For example, the initial debugging information may be captured in addition to the state data at the point in time of 606 above. In one embodiment, a measurement application (or even the application itself) may gather the initial debugging information provided to the host device, such as the set of graphics commands executed prior to or after the breakpoint (e.g., corresponding to the graphics frame immediately after to the breakpoint). For example, this measurement application may intercept graphics commands resulting from execution of the application, which may be used for later playback, e.g., in a bitstream format. In some embodiments, this measurement application may be executed to capture this information for as long or as short a period as desired (e.g., the measurement application could capture the information throughout execution of the application, such as when a debugging option has been invoked). The measurement application could even be compiled into the application when requested.

Accordingly, this initial debugging information may also allow a playback application to re-execute the graphics commands in order to reproduce the data within the captured time period. More specifically, the debugging application in 610 may be used to re-execute graphics commands (or generally re-enact execution of the graphics framework) during the captured period of time, such as the graphics frame immediate after the breakpoint. This re-execution may be necessary in order to provide necessary debugging information to the host device during the debugging process.

Accordingly, in 612, debugging information related to the application may be provided to the host device, e.g., at a single time, such as initially, or multiple times in an iterative fashion.

Note that the specific order of 606, 608, 610, and 612 may be performed in a different order, as desired. For example, the initial debugging information may be gathered before the application is suspended. In another embodiment, the state data may be gathered after the application is suspended. Thus, any of a variety of feasible orders may be used for 606-612. Similar remarks generally apply to any of the method elements described herein.

In 614, execution of the application may be resumed, e.g., after debugging has been performed. For example, a user may request that the target device resume execution of the application by providing input to the host device. Accordingly, the host device may provide a command to the target device to resume execution of the application. Resumption of execution may be performed by reloading the state data saved in 606, unlocking portions of the target device with respect to the application (e.g., as discussed above such as regarding the graphics framework), ceasing execution of the debugging application, etc. Accordingly, the application may resume execution at the point of suspension, proximate to the point that the breakpoint was reached (e.g., the frame after the breakpoint was reached) thereby providing a smoother debugging experience for the developer.

In one embodiment, the process of suspending the application, performing debugging (e.g., using a debugging application executing on the target device, e.g., in conjunction with the development environment executing on the host device), and resuming the application may be performed in a seamless manner, e.g., which is transparent to the user. For example, the user may not be aware that the application is suspended, that a new debugging application was launched, that the debugging application was ended, and the application was resumed in the debugging process.

Note that the methods described above may be used for purposes other than or in addition to debugging, as desired. For example, various other testing that may require or benefit from suspension of execution of an application may be performed using the above-described methods. Thus, the methods described herein are not limited to only performing debugging.

Specific Embodiment Related to the Method of FIG. 6

The following describes one specific embodiment related to the method of FIG. 6. This embodiment is provided as an example only, and is not intended to limit the scope of the systems and methods described herein.

Upon reaching a breakpoint, debugging information may be captured from the executing application. When the capture session finishes, and a "suspend after capture" option has been enabled (e.g., at the time the capture session was initiated), code injected in the inferior, i.e., the application being debugged, may engage a global graphics framework (e.g., OpenGL) lock to prevent any progress in the graphics subsystem, and may then suspend the inferior using kernel functionality, such as APIs. This process may ensure that the application is suspended as soon as the graphics framework capture finishes, thus minimizing the latency (and any change in the state of the program) between the end of the capture and suspension of the application.

Accordingly, a debugging application (e.g., a playback application) may be launched, and the inferior may be placed in the background. This operation may only be a visual operation at that point since the inferior has already been suspended. The debugging application may provide debugging information to the host device initially and/or multiple times to assist in performing debugging, as discussed herein.

When the developer is done debugging the frame and desires resumption of execution of the application (e.g., by selecting "continue"), the frame debugger may notify a monitoring process running on the target device. The notification may request to resume the inferior process (e.g., using kernel functionality) and bring the inferior process back to the foreground (e.g., using OS SPIs). When the process resumes execution, the code injected in the inferior may unlock the global graphics framework lock to allow forward progress in the graphics subsystem. Under memory pressure, the target device may be free to page out read-only code and data pages. They may be reloaded from memory when next accessed.

FIGS. 7A-9C—Exemplary GUIs Corresponding to the Method of FIG. 5

FIGS. 7A-9C are exemplary screen shots of a development environment for debugging execution of an application on a target device, e.g., according to one embodiment of the methods of FIGS. 5 and 6.

Figure 7A:
FIGS. 7A-9C are exemplary GUIs for an corresponding to the methods of FIGS. 5 and 6, according to one embodiment.
Figure 7B:
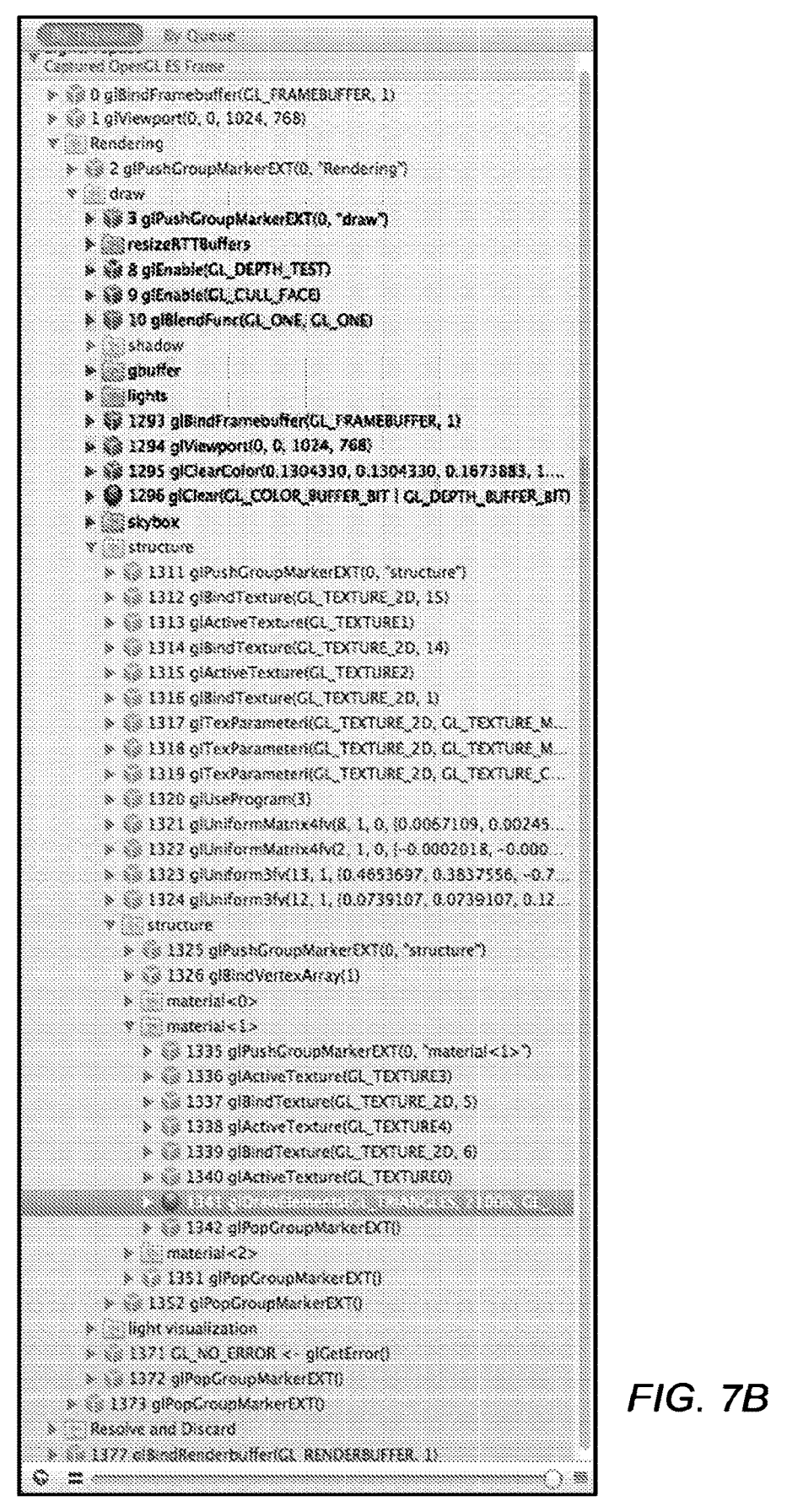
Figure 7C:
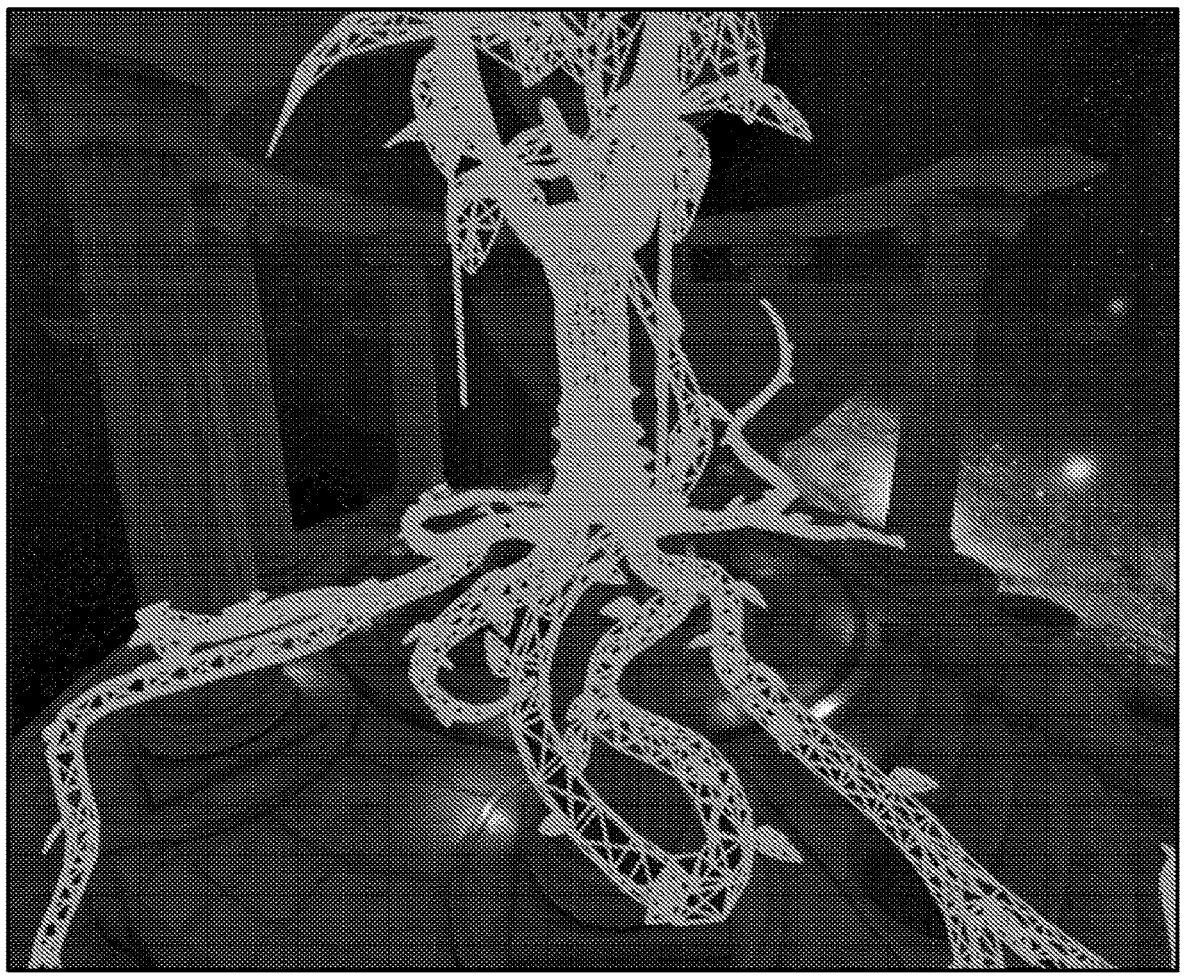

As shown in FIG. 7A, multiple graphics commands within a frame are shown in the tree structure on the left hand side of the GUI. This portion of the GUI is shown in larger form in FIG. 7B. In this particular case, the graphics command "1341glDrawElement(GL_TRIANGLES, 21006, GL_. . . " is selected. Correspondingly, on the right hand side, shown in more detail in FIG. 7D, the source code which called the graphics command is shown. Additionally, in the middle portion, shown in more detail in FIG. 7C, the present graphic corresponding to the graphics command is displayed. Further, the object being modified by the graphics command is highlighted within the graphic. Said another way, the center panel shows the state of the frame buffer at that point in the frame with the geometry for the current draw call highlighted by a wire frame. Other panels show other diagnostic information related to the application.

Figure 8A:
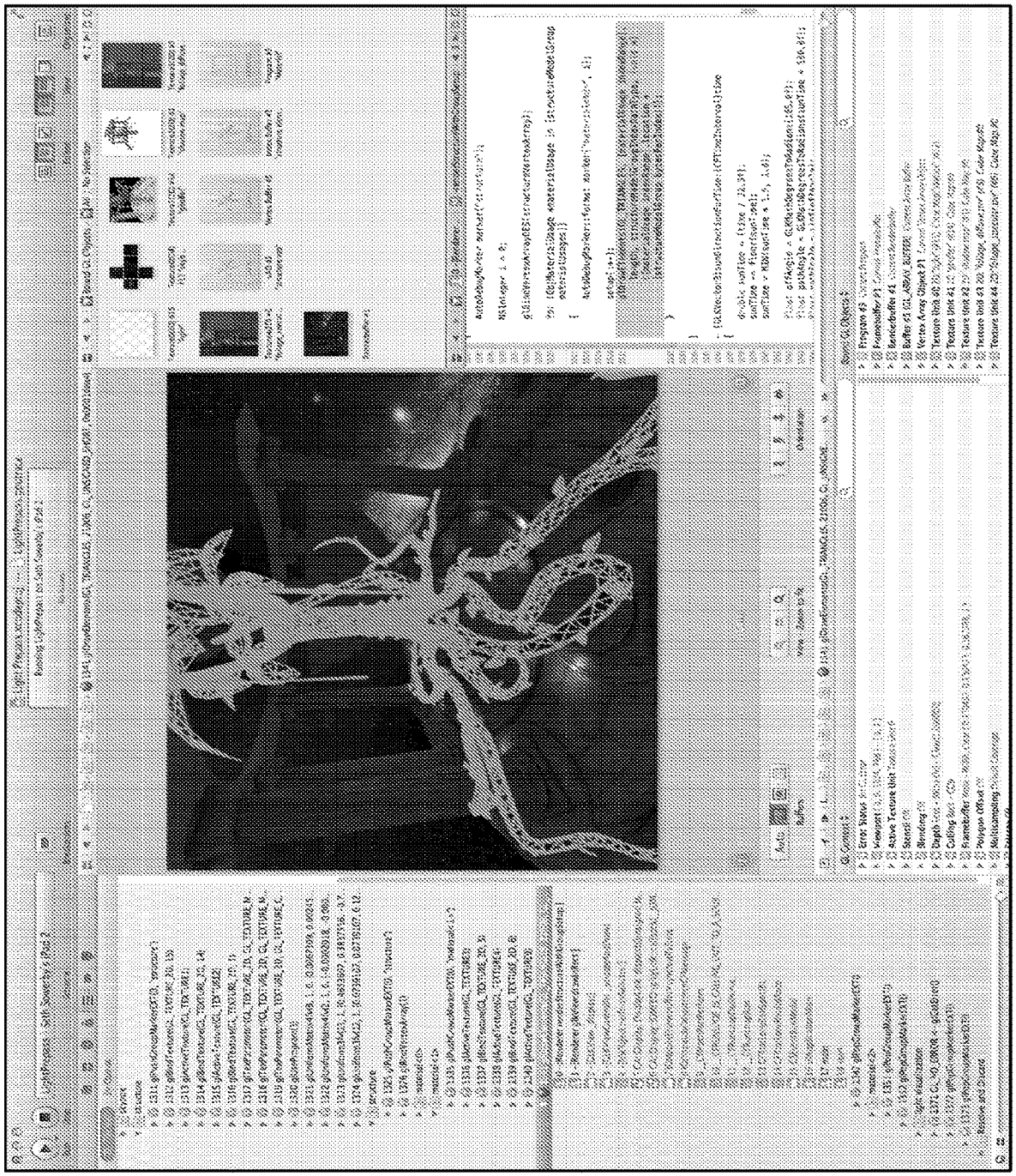
Figure 8B:
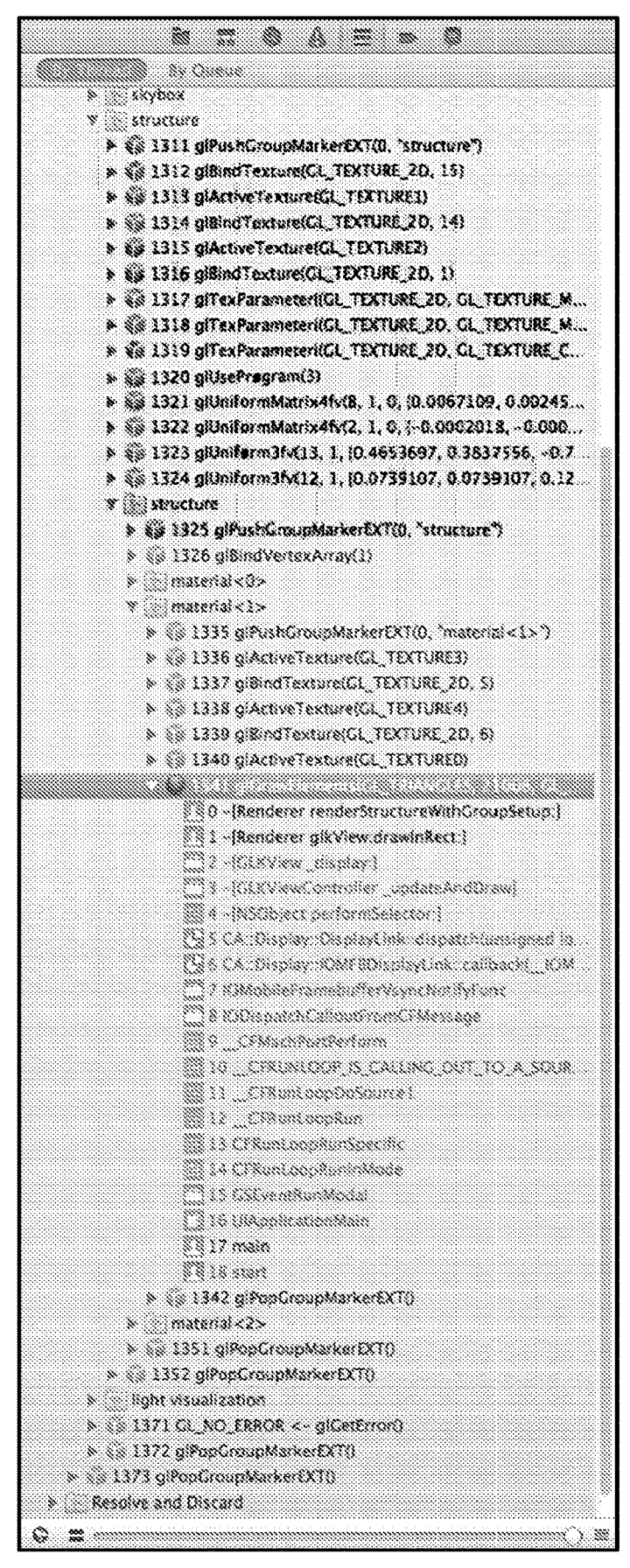
Figure 9A:
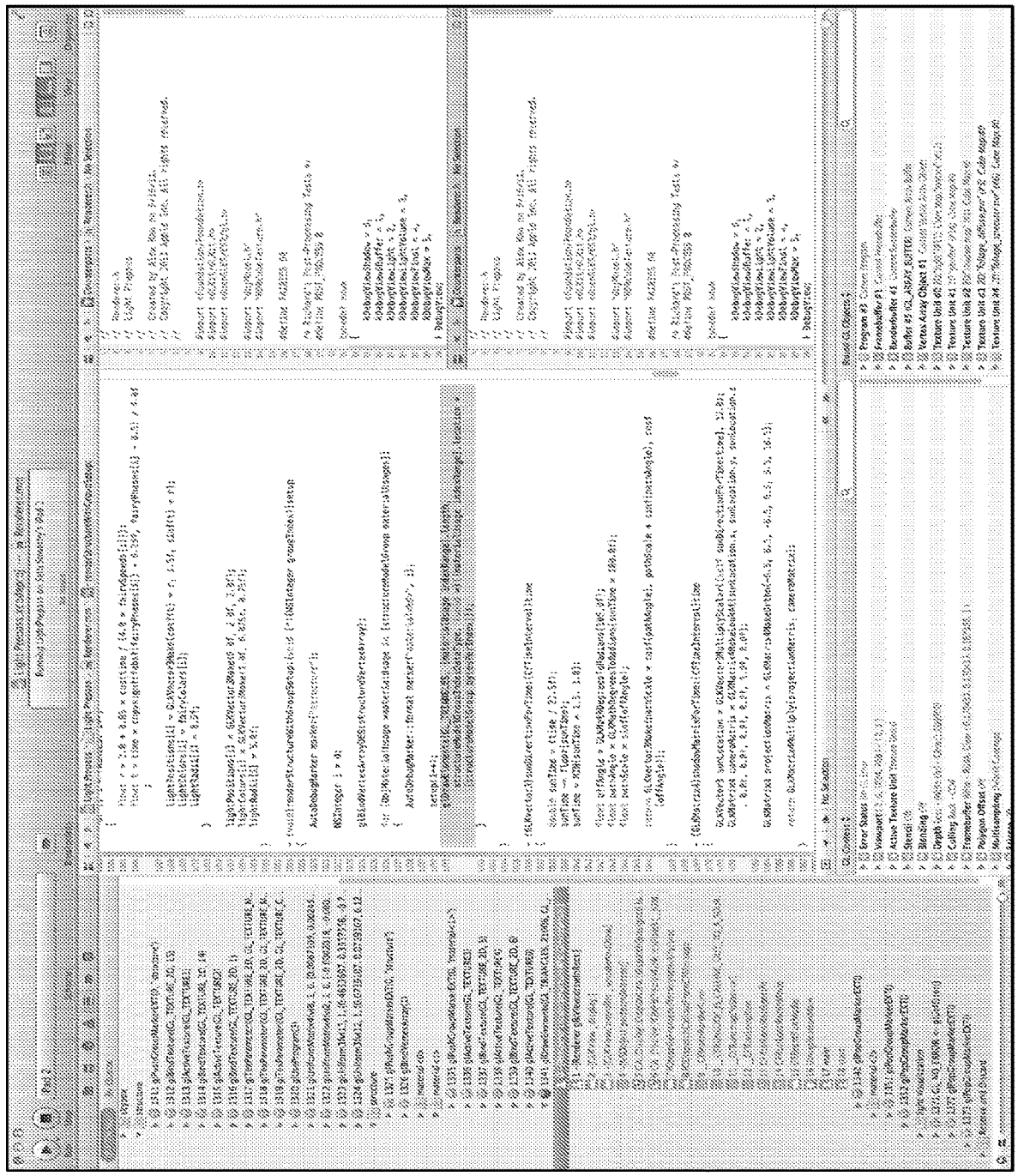
Figure 9B:
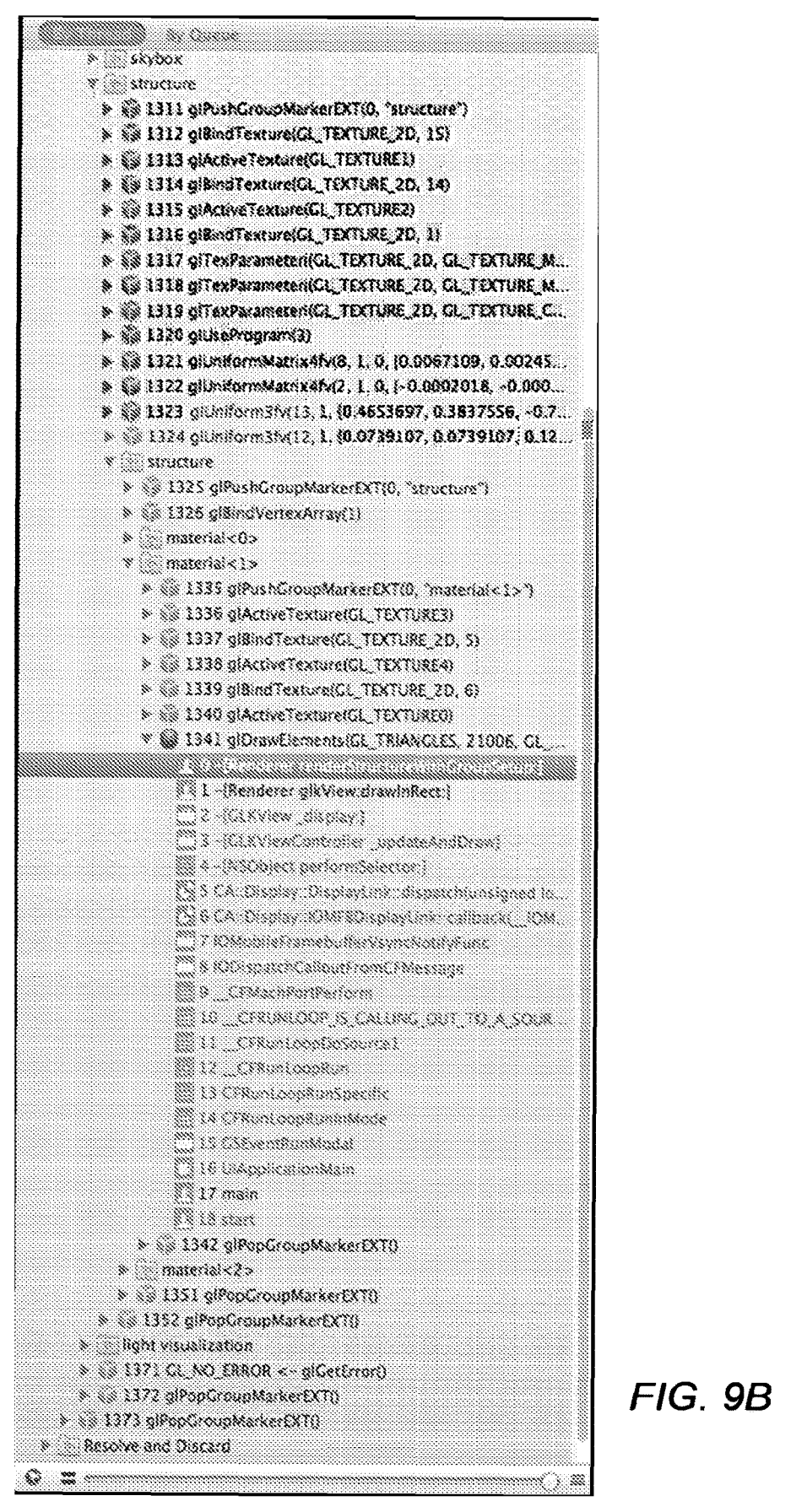

FIG. 8A is largely the same as FIG. 7A, except the current graphics call has been expanded in the tree structure of the left hand panel. More specifically, the CPU stack for the GL call is now displayed. This is shown in more detail in FIG. 8B Finally, in FIG. 9A, a specific point in the CPU call stack is selected ("0-[Renderer renderStructureWithGroupSetup:]"), shown in more detail in FIG. 9B. In response, the center panel of the GUI has changed to the source code corresponding to that element, which is shown in more detail in FIG. 9C. In this particular example, it is the same command highlighted in FIGS. 7A and 8A in the right hand panels, shown in more detail in FIG. 7D.

In one embodiment, the GUI shown in FIGS. 7A-9C may be used in the following manner, which is described in relation to the GUI shown in FIG. 7A. The user may step throughout the graphics commands in the frame, e.g., by selecting them in the navigator window on the left, the hierarchy control on the top, or the frame-scrubber control in the debug bar (above the bottom windows). At the current command, the user may be shown the state of the graphics framework (e.g., the OpenGL in this case) at that point with the current contents of the current render-target front and center. In the window to the right, current objects (e.g., resources) that are currently bound may be shown, and below that, the line of source code corresponding to the graphics command. In the windows at the bottom, the full list of all the graphics framework (e.g., OpenGL) state may be shown in detail.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
   executing a graphics application, wherein the graphics application includes instructions which when executed by a central processing unit (CPU) invoke graphics commands for a graphics processing unit (GPU) to generate graphics; and
   in response to detecting of a breakpoint for the graphics application:
      suspending the execution of the graphics application; and
      preventing additional graphics commands corresponding to the graphics application from being sent to the GPU while allowing commands corresponding to at least one other application to be sent to the GPU.

2. The method of claim 1, further comprising:
   in response to detecting the breakpoint for the graphics application, capturing, based on the breakpoint, information corresponding to execution of the graphics commands by the GPU and information corresponding to execution of the instructions by the CPU.

3. The method of claim 2, wherein the captured information corresponding to the execution of the graphics commands by the GPU comprises information describing contents of a memory corresponding to the GPU.

4. The method of claim 2, wherein the captured information corresponding to execution of the instructions by the CPU comprises information describing contents of a memory corresponding to the CPU when the breakpoint is detected.

5. The method of claim 2, wherein the captured information corresponding to the execution of the graphics commands by the GPU comprises state information.

6. The method of claim 2, further comprising:
displaying, by a user interface, source code corresponding to one or more of the graphics commands and source code corresponding to one or more of the instructions for debugging.

7. The method of claim 6, wherein the user interface displays contents of a memory corresponding to the GPU.

8. A non-transitory computer readable storage medium storing program instructions, wherein the program instructions are executable by a processor to:
execute a graphics application, wherein the graphics application includes instructions which when executed by a central processing unit (CPU) invoke graphics commands for a graphics processing unit (GPU) to generate graphics; and
in response to detection of a breakpoint for the graphics application:
suspend the execution of the graphics application; and
prevent additional graphics commands corresponding to the graphics application from being sent to the GPU while allowing commands corresponding to at least one other application to be sent to the GPU.

9. The non-transitory computer readable storage medium of claim 8, wherein the program instructions are further executable by the processor to:
capture, based on the breakpoint, information corresponding to execution of the graphics commands by the GPU and information corresponding to execution of the instructions by the CPU.

10. The non-transitory computer readable storage medium of claim 9, wherein the program instructions are further executable by the processor to:
display, by a user interface, source code corresponding to one or more of the graphics commands and source code corresponding to one or more of the instructions for debugging.

11. The non-transitory computer readable storage medium of claim 10, wherein the user interface displays contents of a memory corresponding to the GPU.

12. The non-transitory computer readable storage medium of claim 10, wherein the user interface displays state information corresponding to at least one of the GPU or the CPU.

13. The non-transitory computer readable storage medium of claim 10, wherein the user interface concurrently displays the source code corresponding to one or more of the graphics commands and the source code corresponding to one or more of the instructions.

14. The non-transitory computer readable storage medium of claim 13, wherein the source code corresponding to the one or more graphics commands comprises source code proximate to the breakpoint and the source code corresponding to the one or more instructions comprises source code proximate to the breakpoint.

15. A system comprising:
a central processing unit (CPU);
a graphics processing unit (GPU) coupled to the CPU; and
at least one memory coupled to at least one of the CPU or the GPU, wherein the memory stores a graphics application, wherein the graphics application, when executed on the CPU, provides graphics commands to the GPU to generate graphics data;
wherein the CPU is configured to:
execute the graphics application;
in response to detection of a breakpoint for the graphics application:
suspend the execution of the graphics application; and
prevent additional graphics commands corresponding to the graphics application from being sent to the GPU while allowing commands corresponding to at least one other application to be sent to the GPU.

16. The system of claim 15, wherein the CPU is further configured to:
capture, based on the breakpoint, information corresponding to execution of the graphics commands by the GPU and information corresponding to execution of instructions by the CPU.

17. The system of claim 16, wherein the captured information comprises information describing contents of a memory corresponding to the GPU.

18. The system of claim 16, wherein the captured information comprises information describing contents of a memory corresponding to the CPU.

19. The system of claim 16, wherein the system further comprises a bus that couples the GPU to the CPU.

20. The system of claim 16, wherein the captured information comprises state information corresponding to at least one of the CPU or the GPU.

* * * * *